s3,138,150
SUBMERGED HOT GAS HEAT EXCHANGER
James P. Hyer, Norristown, and Joseph J. Santoleri, Wayne, Pa., assignors to Thermal Research & Engineering Corporation, Conshohocken, Pa., a corporation of Delaware
Filed Sept. 11, 1962, Ser. No. 222,785
3 Claims. (Cl. 126—360)

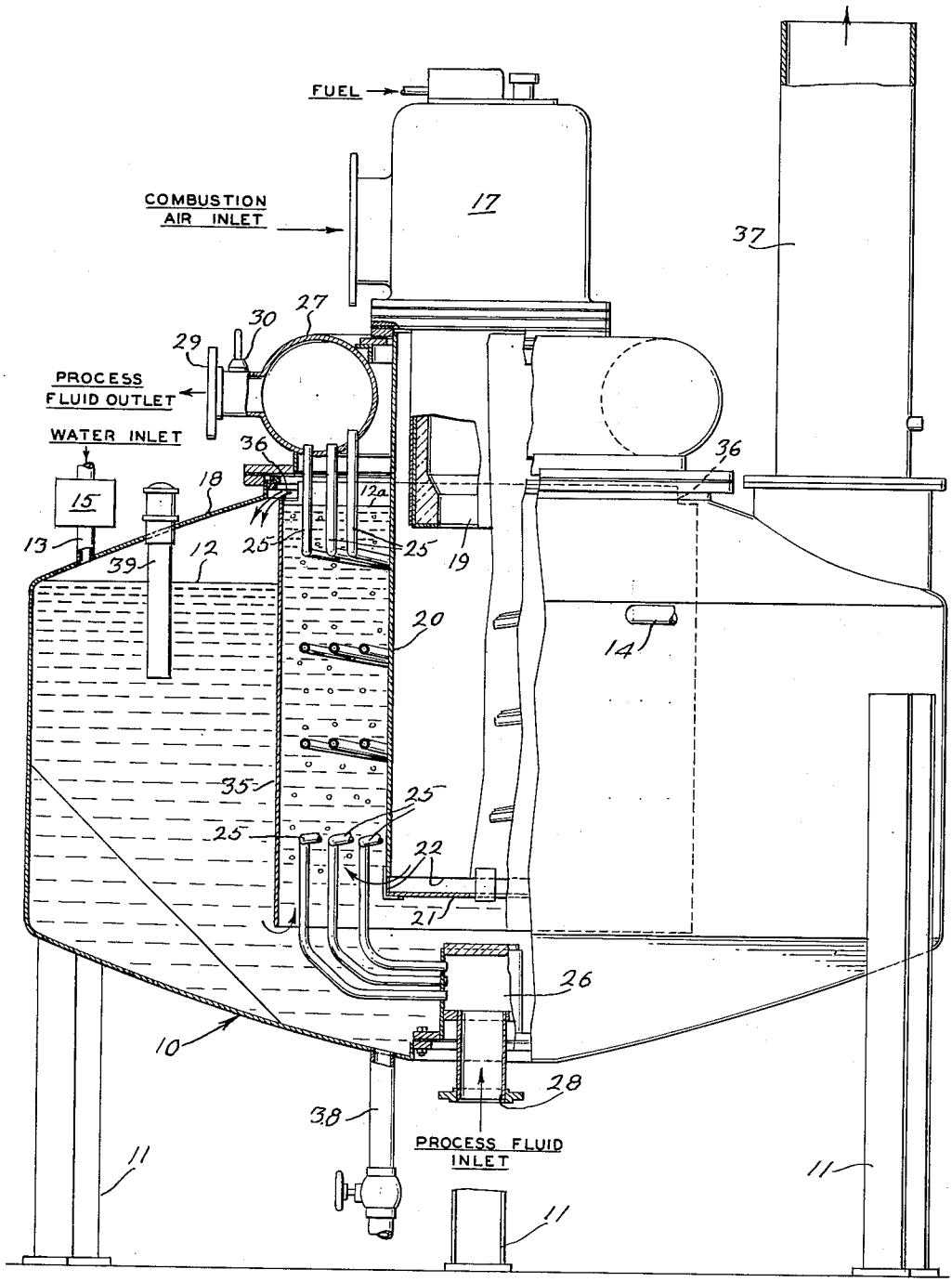

This invention relates to a submerged hot gas heat exchanger and has for an object the provision of improvements in this art.

One of the particular objects of the invention is to provide a submerged burner type of heat exchanger which has a very high rate of heat exchange for its size.

Another object is to provide a heat exchanger of this type which is very efficient in operation.

Another object is to provide a heat exchanger of this type which is very simple and inexpensive to build, operate and service.

A more particular object is to provide a heat exchanger of this type in which a submerged burner downcomer tube is surrounded by a weir, shroud, or baffle in which fluid conducting tubes or pipes for the subject fluid are enclosed whereby the hot combustion gases and heat transfer liquid are induced to flow upwardly around the fluid conducting tubes with great turbulence to heat the tubes and to cause the heat exchange liquid to flow upward through openings in the upper end of the weir or baffle and then flow downwardly outside the weir or baffle within an enclosure or tank chamber in which the liquid is circulated.

The apparatus is especially advantageous for heating liquid nitrogen flowing through tubes. In usual heat exchange apparatus it is very difficult to prevent ice formation on the tubes at the very low temperatures of down to about minus 320° F., and this greatly reduces the rate of heat transfer; whereas with the present apparatus it is possible to prevent freezing entirely and this, added to the very great increase in heat exchange rate otherwise realized, makes this apparatus very advantageous to use.

The above and other objects of the invention, as well as various features of novelty and advantages, will be apparent from the following description of an exemplary embodiment, reference being made to the accompanying drawings thereof wherein:

The single figure is a vertical section and side elevation of apparatus embodying the invention.

As shown in the drawings, a tank 10 is supported on legs 11 and the tank is kept filled with a heat exchange liquid, such as water, to a level 12 near the top, leaving a space thereabove for exhaust gases. Liquid may be supplied to the tank by a pipe 13 and withdrawn by a pipe 14 in order to keep the liquid level at the desired point and also to provide circulation to keep the temperature at the desired point. A control 15, as for temperature, is provided on the inlet pipe.

A fuel burner 17 is mounted on the cover 18 of the tank and has a nozzle 19 above normal liquid level surrounded by a downwardly extending bore downcomer tube 20 projecting into the tank. The lower end of the downcomer tube 20 is located beneath the liquid level and relatively near the bottom of the tank. It has a baffle plate 21 secured across its lower end. On the side above the bottom plate the downcomer tube is provided with openings 22 for combustion gases to flow outwardly therefrom into the surrounding liquid.

Means are provided for passing subject fluid to be heated through the tank, the means here provided comprising a plurality of tube coils 25 surrounding the downcomer tube, the coils at the lower end being connected to a manifold or header 26 secured in the bottom of the tank and at the upper end passing through the top of the tank and thereabove being connected to an annular manifold or header 27 surrounding the burner. A supply pipe 28 is connected with the bottom header 26 and a discharge pipe 29 is connected with the header 27. The flow of subject liquid may be regulated by any suitable control means such as a thermostat 30 in the discharge pipe 29. The device is especially adapted for heating liquid nitrogen, say from about minus 320° F. up to about plus 130° F., hence it is very important that the surrounding heat exchange liquid (water) will not freeze on the coils 25. The present apparatus has been found to be very effective for this purpose.

The heat exchange liquid is confined with the ascending hot gases around the coils 25 by a baffle, shroud or weir 35 which is tubular in shape with its lower end disposed below the level of the lower end of the downcomer tube; and its upper end is provided with side openings 36 for the outflow of hot gases and water into the open space above outside the water level 12.

Spent gases leave the tank by way of the exhaust pipe 37 at the top of the tank. A water drain pipe 38 with a suitable valve is provided in the bottom of the tank. A water level control device 39 is provided in the top of the tank.

In operation, the subject or process fluid passes upward from the supply pipe 28 and header 26 through the coils 25 to the header 27. Hot combustion gases and water heated rapidly thereby flow upward in the annular space between the downcomer tube 20 and the weir 35 and heat the coils 25 and the fluid therein. At the lower end the subject or process fluid is very cold and in usual installations has caused water to freeze on the outside of the coils with consequent drop in efficiency but with the present arrangement having the weir 35 closely surrounding the coils and having hot gases impinge on the coils near the point of entry in the tank it has been found that there is no freezing in the upflow space between the downcomer tube and the weir and that the heat exchange operation proceeds with great efficiency.

As an example of the unusual and unexpected efficiency of the apparatus, it was found that the apparatus without the confining weir provided a heat transfer rate to the subject fluid of 150 B.t.u., per sq. ft. per degree F. per hour; whereas with the weir the rate was increased up to as much as 500 to 600 B.t.u. per sq. ft. per degree F. per hour. This apparently is due to keeping the hot gases and upflowing liquid confined in a narrow annular space and producing great turbulence around the coils. The water in the annular space rises to a higher level 12a and overflows into the larger annular space outside the weir, returning by downflow to the lower end of the weir. This forced directed circulation provides very effective operation and keeps even the parts of the coils below the lower end of the weir very hot and free from ice.

Water can be flowed through the tank to prevent undue steaming and to keep the level up to the desired point.

It is thus seen that the invention provides a great improvement in the heat exchange effectiveness and heats the subject or process fluid very rapidly and with great efficiency.

While one embodiment of the invention has been described for purposes of illustration, it is to be understood that there may be various embodiments and modifications within the general scope of the invention.

We claim:
1. Submerged hot gas heat exchange apparatus, comprising in combination, a tank holding a body of heat exchange liquid therein, a fuel burner having a nozzle above the tank, a bare downcomer tube surrounding and extending downwardly from said burner nozzle and having its lower end submerged in the liquid, a coil for subject liquid to be heated surrounding said downcomer tube, said downcomer tube providing an opening at its lower end for the escape of combustion gases therefrom into the liquid around said coil, means for baffling the downflow of hot gases from said downcomer tube, and a weir surrounding said coil and spaced from said downcomer tube and the sides of said tank to provide an interior annular space for ascending hot gases and liquid over said coil and an outer annular space for the downflow of liquid, said weir having an opening at the top above the operating liquid level in said tank for the outflow of gas and liquid.

2. Apparatus as set forth in claim 1, in which the lower end of the weir is located below the level of the lower end of the downcomer tube.

3. Apparatus as set forth in claim 1, in which said baffle means includes a bottom plate over the end of the downcomer tube with lateral gas outflow openings above said bottom end plate, and in which the lower end of the weir is located at a level below the end of the downcomer tube.

References Cited in the file of this patent

UNITED STATES PATENTS

| | | |
|---|---|---|
| 1,980,424 | Morgan | Nov. 13, 1934 |
| 2,638,895 | Swindin | May 19, 1953 |
| 2,878,644 | Fenn | Mar. 24, 1959 |
| 2,902,029 | Hill | Sept. 1, 1959 |